United States Patent
Kerr et al.

(10) Patent No.: US 6,698,579 B1
(45) Date of Patent: Mar. 2, 2004

(54) AUTOMATIC HANDLING DEVICE FOR FLEXIBLE FLAT PRODUCTS, IN PARTICULAR CATAMENIAL PRODUCTS AND INTERMEDIATE STACKER UNIT TO BE USED THEREIN

(75) Inventors: Geoffrey J. Kerr, Geneva (CH); Peter Wiedmann, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/806,884

(22) PCT Filed: Oct. 20, 1999

(86) PCT No.: PCT/US99/24506

§ 371 (c)(1),
(2), (4) Date: Oct. 29, 2001

(87) PCT Pub. No.: WO00/24637

PCT Pub. Date: May 4, 2000

(30) Foreign Application Priority Data

Oct. 23, 1998 (EP) .............................................. 98120073

(51) Int. Cl.$^7$ .............................................. B65H 29/40
(52) U.S. Cl. .................................... 198/578; 198/463.2
(58) Field of Search .................. 414/331.13; 198/347.1, 198/347.2, 463.2, 578, 592, 593

(56) References Cited

U.S. PATENT DOCUMENTS

| 3,370,689 | A | * | 2/1968 | Van Der Winden | ......... 198/408 |
| 3,954,165 | A | | 5/1976 | Snyder | |
| 4,520,925 | A | | 6/1985 | Johnson | |
| 4,577,453 | A | | 3/1986 | Hofeler | |
| 5,127,209 | A | | 7/1992 | Hunter | |
| 5,191,963 | A | * | 3/1993 | Delsanto | ...................... 198/429 |
| 5,409,097 | A | * | 4/1995 | Hoegger | .................. 198/463.2 |
| 5,996,992 | A | * | 12/1999 | Raschke et al. | ............. 271/200 |
| 6,170,635 | B1 | * | 1/2001 | Rommelli | ..................... 198/429 |

FOREIGN PATENT DOCUMENTS

| EP | 0 192 206 A2 | 8/1986 |
| EP | 0 534 902 A1 | 8/1994 |
| EP | 0 465 207 B1 | 10/1994 |

* cited by examiner

*Primary Examiner*—Christopher P. Ellis
*Assistant Examiner*—Mark A. Deuble
(74) *Attorney, Agent, or Firm*—Kevin C. Johnson; Bridget D. Ammons

(57) ABSTRACT

An automatic handling device for flexible flat products, in particular catamenials, comprises: conveying means (2) on the infeed side for the serial guidance of the supplied products (1) in a main infeed direction (3), conveying means (4) on the outfeed side for the intermediate stacker units (5), the compartments (9) of which are charged with products (1), to be led off in a main outfeed direction (7) which is substantially perpendicular to the main infeed direction (3), and a feed head (8) for the products (1) between the conveying means (2, 4) on the infeed side and on the outfeed side, which oscillates about a pivoting axis (18) in the plane spanned by the main infeed direction (3) and outfeed direction (7) such that, during the oscillating motion in the main outfeed direction (7), the end (16) of the feed head (8) that is turned towards the respective intermediate stacker unit (5) is synchronous with the respective 4 compartment (9) of the intermediate stacker unit (5) for a product (1) to be transferred into this compartment (9), and that, during the oscillating motion in the opposite direction, it orients itself toward the next compartment (9).

9 Claims, 3 Drawing Sheets

Figure 1:
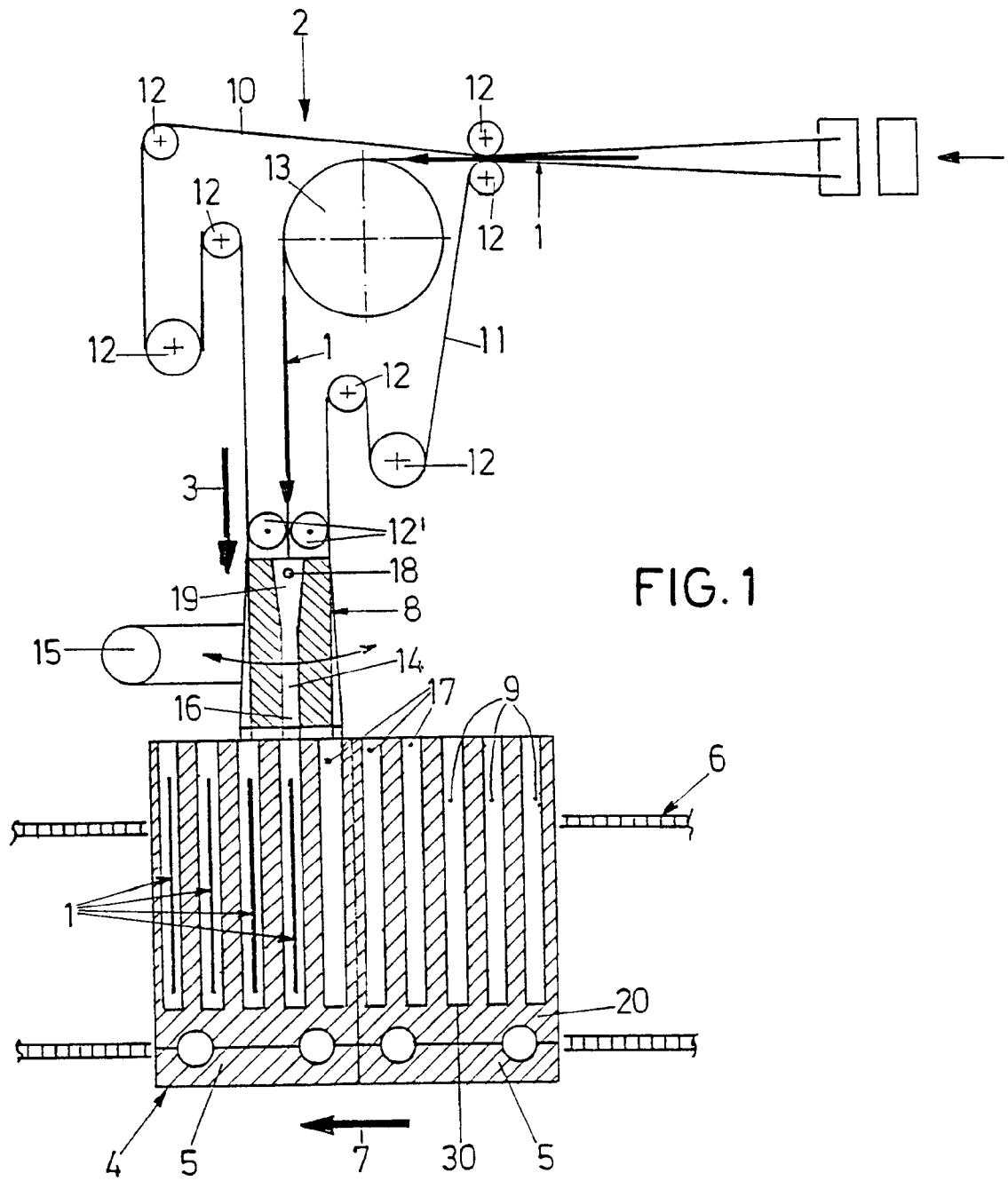

AUTOMATIC HANDLING DEVICE FOR FLEXIBLE FLAT PRODUCTS, IN PARTICULAR CATAMENIAL PRODUCTS AND INTERMEDIATE STACKER UNIT TO BE USED THEREIN

The invention relates to an automatic handling device for flexible flat products, in particular catamenial products such as sanitary towels, pantiliners or the like, as well as to an intermediate stacker unit to be used in this handling device.

In the fabrication of the afore-said products, automatic handling during the virtual manufacturing process and subsequent packaging process poses special problems because of the flexibility and irregular shape of the products. Defined and gentle product treatment must be ensured for the manufacturing and subsequent packaging process to be performed reliably and with as little susceptibility to failure as possible.

The most varying handling devices for various flexible products are known from prior art. For instance, EP 0 356 654 A1 teaches an apparatus for the supply of packing blanks to a packaging machine in which cassettes are used that are open at the top. They comprise several stacks of blanks one beside the other. By means of a corresponding automatic conveyor, the cassettes are placed on a cassette conveyor which is disposed on the rear of the packaging machine, simultaneously serving as a storage area for a multitude of filled cassettes. In the vicinity of a discharging station, the stacks of blanks are successively removed from the cassettes and, by upward motion and ensuing transverse motion, supplied to one or several magazines of blanks of the packaging machine.

EP 0 465 207 B1 teaches a method and an apparatus for packaging resiliently deformable articles into a box-shape by using a sheet of film, in which the stack to be packaged is inserted into an inner cassette. The latter cooperates with an outer cassette and corresponding folding, overlapping and sealing means with a sheet of film placed in between so as to form a closed wrap around the said stack.

DE 43 42 112 C1 relates to an apparatus for the grouped packaging of filled tea bags, in which a stacking shaft is used for forming and fixing the row of bags. In the inlet area of the stacking shaft, retaining fingers which are fixed in the lengthwise direction are provided together with lengthwise displaceable bag holding means, the tea bags which are individually supplied by bag advancing means being positioned between them.

It is the object of the present invention to have an automatic handling device comply as optimally as possible with the processing requirements of flat flexible products and in particular of catamenial products such as sanitary towels, pantiliners or the like so as to obtain high output rates accompanied with little susceptibility to failure. Due to the conventional structure of the manufacturing plant on the one hand and the packaging station on the other, the products are transferred from a continuous flow of serially supplied products into individual compartments of modular, continuously moving intermediate stacker units for the products thereby to be led off to the packaging machine.

In accordance with the invention, the automatic handling device, for the purpose of this transfer, comprises conveying means on the infeed side for the serial guidance of the supplied products in a main infeed direction, conveying means on the outfeed side for the intermediate stacker units, the compartments of which are charged with products, to be led off in a main outfeed direction which is perpendicular to the main infeed direction, and a feed head for the products between the conveying means on the infeed side and on the outfeed side, which oscillates about a pivoting axis in the plane spanned by the main infeed and outfeed direction such that, during the oscillating motion in the main outfeed direction, the end of the feed head that is turned towards the respective intermediate stacker unit is synchronous with the respective compartment of the intermediate stacker unit for a product to be transferred into this compartment, and that, during the oscillating motion in the opposite direction, it orients itself toward the next compartment.

The gist of the invention resides in the oscillating feed head which ensures the intermediate stacker units to move continuously. This is of advantage since as a rule these intermediate stacker units are moved ahead by a comparatively voluminous chain drive, the stop and go operation of which, in the case of conventional handling devices, causes considerable strain on the handling device accompanied with corresponding wear because of the high inertias. In the case of the subject matter of the invention, only the feed head has to perform a discontinuous motion, which is by far easier to control in terms of machine equipment. Finally, as a result of the use of an intermediate stacker unit, the flexible products are properly guided during handling and kept definedly positioned for a subsequent packaging process. Consequently, a stacking job which is conventionally necessary for the flexible flat products can be carried out at a high speed, the stability of the stacking process being maintained and the mechanical strain on the plant being reduced.

Preferred embodiments of the handling device relate to the conveying means on the infeed side, to the design of the feed head in the form of an oscillating slotted block as well as the configuration of the intermediate stacker units as a conveying cassette having at least one take-up slot for the flat products.

As already mentioned at the outset, the invention also relates to an intermediate stacker unit in particular to be used in the afore-said handling device in a configuration as a conveying cassette having at least one slot. Preferred embodiments of the intermediate stacker unit relate to the shaping of this slot and especially to its contours. These are of special importance in particular in the handling of catamenial products such as sanitary towels or pantiliners, since these articles have inherent variations in curvature and orientation in the delivery from the production line. The intermediate stacker unit in the form of a conveying cassette can compensate for these variations.

A substantial advantage of the conveying cassette slots contoured according to the invention resides in that on the one hand a wide opening is formed for the insertion of the product into the slot, which maximizes the so-called process window for the infeed of the product into the cassette. Simultaneously, during outfeed, a very accurately defined outfeed position of the product is produced by the narrowed section of the slot, which renders this handling job likewise more reliable.

Figure 2:
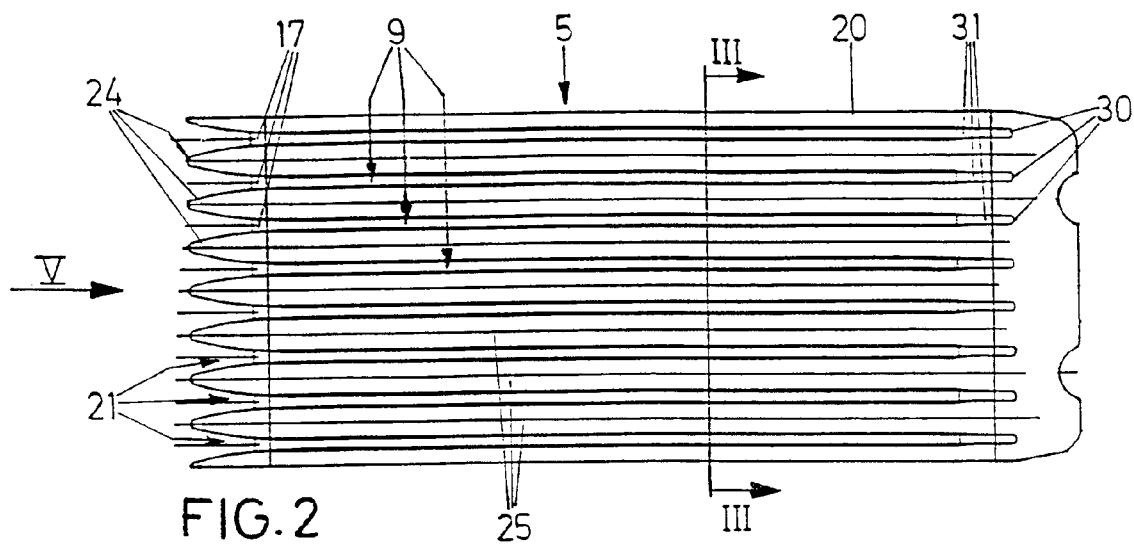
Figure 3:
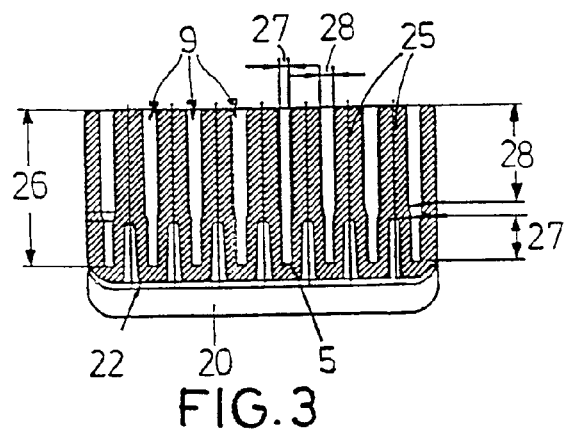
Figure 5:
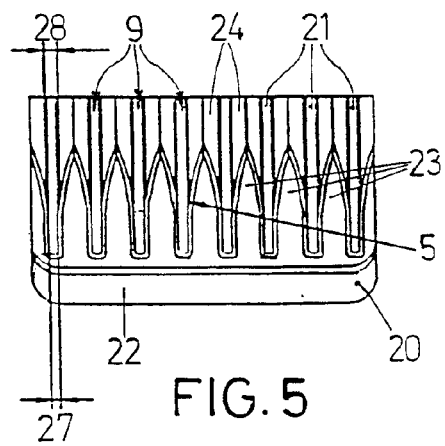
Figure 4:
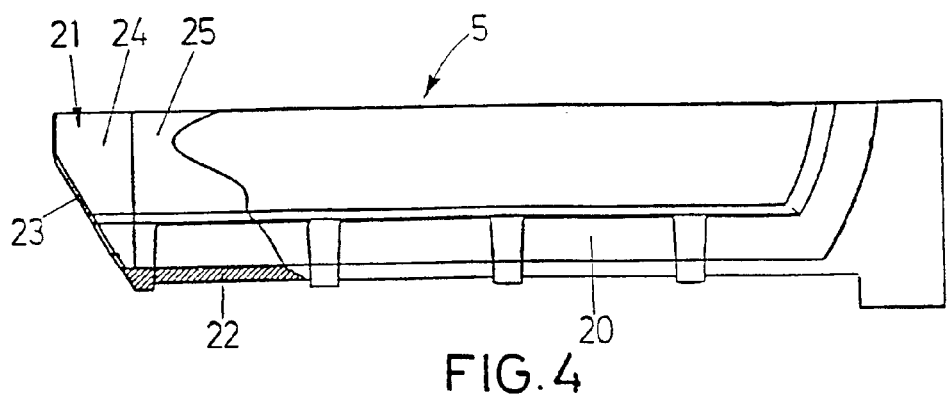
Figure 6A:
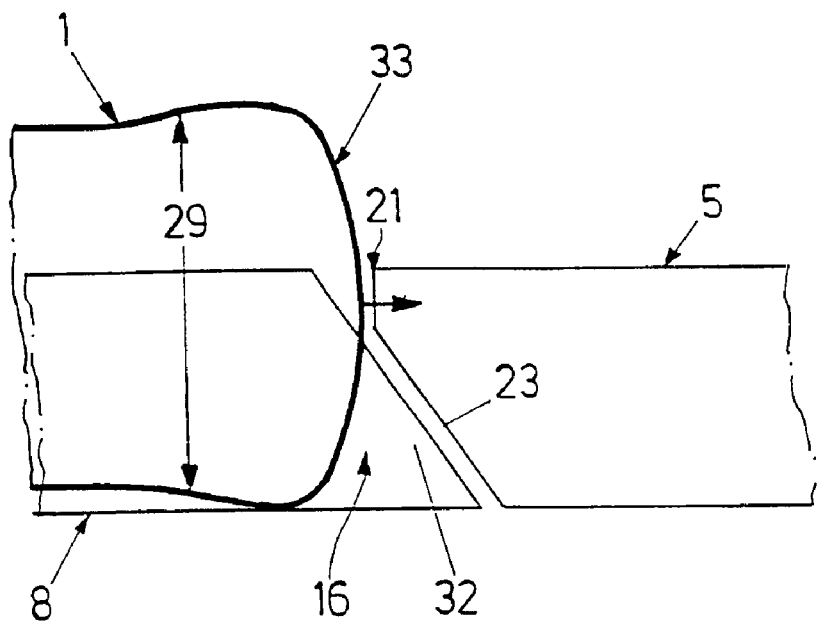

Further details, in particular with a view to the intermediate stacker unit according to the invention, will become apparent from the ensuing description of an exemplary embodiment, taken in conjunction with the drawing, in which FIG. 1 is a diagrammatic plan view of a handling device, FIG. 2 is a plan view of a conveying cassette, FIG. 3 is a vertical section through the conveying cassette on the section line III—III of FIG. 2, FIG. 4 is a partially cut lateral view of the conveying cassette of FIG. 2, FIG. 5 is a front view of the conveying cassette from the direction of the arrow V of FIG. 2, and FIGS. 6A and B are highly diagrammatic side views of details of the handling device at varying stations of product flow.

The automatic handling device for pantiliners 1, which is diagrammatically outlined in FIG. 1, comprises conveying means 2 on the infeed side, denoted in their entirety by 2, for the serial guidance of the pantiliners 1 in a main infeed direction 3 as well as conveying means 4 on the outfeed side. These conveying means 4 on the outfeed side substantially comprise individual intermediate stacker units 5 in the form of conveying cassettes which are disposed successively on a chain conveyor 6, leading the pantiliners 1 off towards a packaging arrangement (not shown in detail) in a main outfeed direction 7 which is perpendicular to the main infeed direction 3. An oscillating feed head in the form of a slotted block 8 is disposed between the conveying means 2, 4 on the infeed side and on the outfeed side, providing for the supply of one pantiliner 1 at a time to the individual slot-type compartments 9 in the conveying cassettes 5, which will still be described in detail.

The conveying means 2 on the infeed side comprises a twin belt conveyor having two conveyor belts 10, 11 resting on each other and guided via corresponding guide pulleys 12. The two conveyor belts 10, 11 take the pantiliner 1 serially one after the other from the production line and guide them via a deflection pulley 13 in the main infeed direction 3 to the slotted block 8. With reference to FIG. 1, the orientation of the pantiliners 1 is such that their narrow side is upright relative to the plane of the drawing.

Through deflection of the two conveyor belts 10, 11, the pantiliners 1 successively leave the guide pulleys 12' which mark the end of the conveying means 2 on the infeed side and enter the slot 14 of the slotted block 8. The latter's oscillating motion is synchronized by a corresponding oscillating drive mechanism 15 to combine with the continuous motion of the conveying cassettes 5 in the main outfeed direction 7 in such a way that when a pantiliner 1 passes through the slot 14, the latter's end 16 on the outfeed side is in alignment with an inlet port 17 of the respective slot-type compartment 9 in the conveying cassette 5. Once a pantiliner 1 is inserted in a compartment 9, the slotted block 8 orients itself towards the next slot-type compartment 9 by the oscillating motion counter to the main outfeed direction 7. Again the compartment 9 and the slotted block 8 run synchronous for the next pantiliner 1 to be inserted into the conveying cassette 5. The slotted block 8 oscillates in the plane spanned by the main infeed direction 3 and the main outfeed direction 7 about a pivoting axis 18 roughly outlined in FIG. 1 in the vicinity of the end 19, on the infeed side, of the slotted block 8. As seen in FIG. 1, with a view to improving and obtaining increased reliability in the guidance of the pantiliner by the slotted block 8, the end 19, on the infeed side, of the slot 14 widens in the way of a funnel, whereas the end 16 on the outfeed side is narrowed as opposed to the inlet port 17.

The design of the conveying cassettes 5 which constitute the intermediate stacker units can be seen in FIGS. 2 to 5. They consist of a substantially cuboidal cassette 20 which is integrally produced from plastic material and in which slots 9 are molded parallel to the lengthwise direction, the slots 9 being open laterally and at the top for the accommodation of in each case one pantiliner 1 in an upend condition set on its longitudinal edge. The lateral open side of the slots 9 constitute the inlet ports 17, on the infeed side, of the slots which are provided with a funnel-type enlargement 21 towards the upper edge of the cassette as seen in FIG. 2. This enlargement 21 is formed by a projection 24 on the cassette partitions 25 which define the slots 9, this projection 24 extending as an upwardly skewed activity 23 from the bottom 22 of the conveying cassette 5. As seen in FIG. 3, each slot 9 is divided in depth 26 into a lower narrow portion 27 and an upper expanded portion 28. The depth 26 of the slots 9 corresponds to approximately half the height 29 of a pantiliner 1 lodging edgewise in the slot 9 (FIG. 6). Another characteristic of the shape of the slots 9 resides in that ahead of their closed end 30 which is opposite to the inlet port 17 they possess a smaller, reduced section 31 where the embossed rim of the pantiliner takes its place.

The purpose of the shape explained above of the inlet port 17 of the slots 9 will be explained, based on FIG. 6A. FIG. 6A diagrammatically outlines the condition in which the slotted block 8 and the conveying cassette 5 run synchronous. As seen in this drawing, the slotted block 8 possesses a nose 32 of an inclination that corresponds to the activity 23, this nose 32 forming the end 16, on the outfeed side, of the slot 14. When a pantiliner 1 passes from the slotted block 8 into the conveying cassette 5, the advancing edge 33 of the pantiliner 1 first enters the slot 9 in the vicinity of the funnel-type enlargement 21 at the top of the conveying cassette 5. The funnel-type shape helps attain on the one hand unimpeded passage of the advancing edge 33 into the slot 9 and on the other hand guidance and positioning of the pantiliner 1 in the conveying cassette 5 that become narrower and thus more defined as the depth of entry increases. As a result of the lower narrow portion 27, in particular the lower embossed lengthwise edge of the pantiliner is well guided and positioned with a view to its subsequent entry into a packaging station.

Figure 6B:
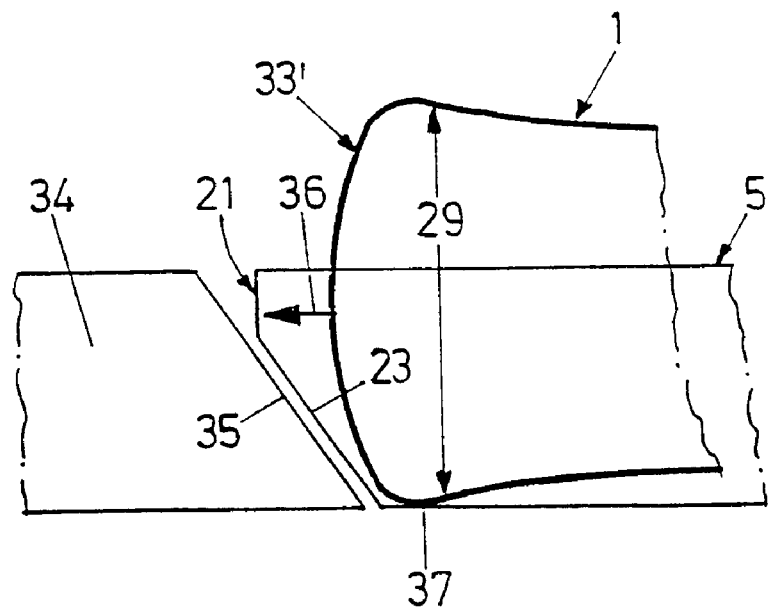

This entry is roughly outlined in FIG. 6B which shows the conveying cassette 5 to be in opposition of a product guide 34. Again the edge 35, on the cassette side, of this guide 34 is inclined to match the activity 23. When the pantiliner 1 is pushed out of the conveying cassette 5 in the outfeed direction 36, the lower edge of the pantiliner 1 is the first to pass into product guide 34. The position of this lower end portion 37 is well defined by the narrow portion 27 of the slots 9 so that a proper passage of the pantiliner 1 from the conveying cassette 5 into the product guide 34 is ensured. The in this case advancing edge 33' passes into the product guide only at a later time when a good guiding effect has again been achieved by the lower edge.

What is claimed is:

1. An automatic handling device for flexible flat catamenial products for the transfer of the products from a continuous flow of serially supplied products into individual compartments of modular, continuously moving intermediate stacker units for the products to be led off in particular to a packaging machine, comprising conveying means on the infeed side for the serial guidance of the supplied products in a main infeed direction, wherein the conveying means on the infeed side are twin conveyor belts conveying the product between them;

conveying means on the outfeed side for the intermediate stacker units, the compartments of which are charged with products, to be led off in a main outfeed direction which is substantially perpendicular to the main infeed direction, and a feed head for the products between the conveying means on the infeed side and on the outfeed side, wherein the feed head is an oscillating slotted block, the slot of which serves as a guide for the product; said feed head oscillates about a pivoting axis in a plane spanned by the main infeed direction and outfeed direction such that, during the oscillating motion in the main outfeed direction, the end of the feed head that is turned towards the respective intermediate stacker unit is synchronous with the respective compartment of the intermediate stacker unit for a product to be transferred into this compartment, and that, during the oscillating motion in the opposite direction, it orients itself toward the next compartment.

2. A handling device according to claim 1, wherein the lot widens in the way of a funnel at its end on the infeed side.

3. A handling device according to claim 1, wherein the end, on the outfeed side, of the slot is narrowed as opposed to the latter's end on the infeed side.

4. A handling device of claim 1, wherein the intermediate stacker units of the conveying means on the outfeed side are conveying cassettes provide with at least one accommodation lot a compartment.

5. A handling device according to claim 1, wherein said conveying cassette has at least one slot for the accommodation of product in an upend condition.

6. A handling device according to 5, wherein each slot is divided in depth into a narrow portion and an upper expanded portion.

7. A handling device according to claim 5, wherein each slot is provided with a funnel-type enlargement at its end on the feed side.

8. A handling device according to claim 7, wherein the funnel-type enlargement is a tapering projection of the conveying cassette partition which defines the slot, the projection extending as an upwardly skewed activity from the bottom of the conveying cassette.

9. A handling device according to claim 5, wherein each slot is closed at its end opposite to the end on the infeed side.

* * * * *

UNITED STATES PATENT AND TRADEMARK OFFICE
CERTIFICATE OF CORRECTION

PATENT NO. : 6,698,579 B1
DATED : March 2, 2004
INVENTOR(S) : Kerr et al.

It is certified that error appears in the above-identified patent and that said Letters Patent is hereby corrected as shown below:

<u>Column 6,</u>
Line 14, delete "activity" and insert -- acclivity --.

Signed and Sealed this

Fourth Day of May, 2004

JON W. DUDAS
*Acting Director of the United States Patent and Trademark Office*